US011707711B2

(12) United States Patent
Del Col et al.

(10) Patent No.: US 11,707,711 B2
(45) Date of Patent: Jul. 25, 2023

(54) DEVICE FOR DRYING A GAS, IN PARTICULAR AIR

(71) Applicants: M.T.A. S.P.A., Conselve (IT); UNIVERSITA' DEGLI STUDI DI PADOVA, Padua (IT)

(72) Inventors: Davide Del Col, Padua (IT); Marco Azzolin, Monticello Conte Otto (IT); Arianna Berto, Pernumia (IT); Mario Mantegazza, Casalserugo (IT); Enrico Stevanin, Baone (IT); Alberto Villa, Ponso (IT); Andrea Montecchio, Pernumia (IT)

(73) Assignees: M.T.A. S.P.A., Conselve (IT); UNIVERSITA' DEGLI STUDI DI PADOVA, Padua (IT)

( * ) Notice: Subject to any disclaimer, the term of this patent is extended or adjusted under 35 U.S.C. 154(b) by 344 days.

(21) Appl. No.: 16/912,903

(22) Filed: Jun. 26, 2020

(65) Prior Publication Data

US 2021/0008494 A1 Jan. 14, 2021

(30) Foreign Application Priority Data

Jun. 26, 2019 (IT) .................. 102019000010215

(51) Int. Cl.
*B01D 53/26* (2006.01)
*F28D 9/00* (2006.01)
(Continued)

(52) U.S. Cl.
CPC .......... *B01D 53/265* (2013.01); *F24F 3/1405* (2013.01); *F28D 9/0062* (2013.01);
(Continued)

(58) Field of Classification Search
CPC .... B01D 53/265; F24F 3/1405; F25B 39/022; F25B 2339/0241; F28D 1/0325;
(Continued)

(56) References Cited

U.S. PATENT DOCUMENTS 8,443,868 B2   5/2013   Barnwell
8,857,207 B2   10/2014  Dering et al.
(Continued)

FOREIGN PATENT DOCUMENTS

KR   20180086109 A   7/2018
WO   2005031225 A1   4/2005
WO   2012135864 A1   10/2012

*Primary Examiner* — Eric S Ruppert
*Assistant Examiner* — Hans R Weiland
(74) *Attorney, Agent, or Firm* — Volpe Koenig

(57) ABSTRACT

A drying device for processing a gas to be dried, in particular air, comprises an air/air exchanger which includes an inlet for the gas to be dried and an outlet for the dried gas, an evaporator which receives the gas to be dried from the air/air exchanger, the evaporator being formed by means of a plurality of adjacent layers. The layers comprise at least a first layer configured for the passage of a refrigerating fluid, at least a second layer configured to receive the gas to be dried from the air/air exchanger and a plurality of third layers configured to receive a phase change material. The layers are arranged in a sequence which comprises in alternation a first layer, a third layer, a second layer and a further third layer.

18 Claims, 7 Drawing Sheets

(51) Int. Cl.
*F24F 3/14* (2006.01)
*F28D 20/02* (2006.01)
*F25B 39/02* (2006.01)
*F28D 1/03* (2006.01)
*F28D 21/00* (2006.01)

(52) U.S. Cl.
CPC ......... *F28D 9/0093* (2013.01); *F28D 20/026* (2013.01); *F25B 39/022* (2013.01); *F25B 2339/0241* (2013.01); *F28D 1/0325* (2013.01); *F28D 2021/0038* (2013.01)

(58) Field of Classification Search
CPC ...... F28D 9/0062; F28D 9/093; F28D 20/026; F28D 2020/0013; F28D 2021/0038; F28D 9/0093; F28F 3/025; F28F 3/06
See application file for complete search history.

(56) References Cited

U.S. PATENT DOCUMENTS

| | | | |
|---|---|---|---|
| 2007/0151276 A1* | 7/2007 | Bogart | B01D 53/265 62/285 |
| 2010/0157525 A1* | 6/2010 | Ullman | F28D 20/02 361/688 |
| 2013/0000341 A1* | 1/2013 | De Piero | F28D 9/0093 62/126 |
| 2015/0168047 A1* | 6/2015 | Danjyo | F28D 20/026 62/467 |
| 2015/0198386 A1* | 7/2015 | Goenka | F28D 20/02 165/172 |
| 2017/0261269 A1* | 9/2017 | Tison | F28D 20/02 |
| 2018/0224213 A1* | 8/2018 | Lee | F28D 20/02 |
| 2018/0306525 A1* | 10/2018 | Kitou | F28D 20/026 |
| 2020/0400385 A1* | 12/2020 | Van Bael | F28D 20/026 |

* cited by examiner

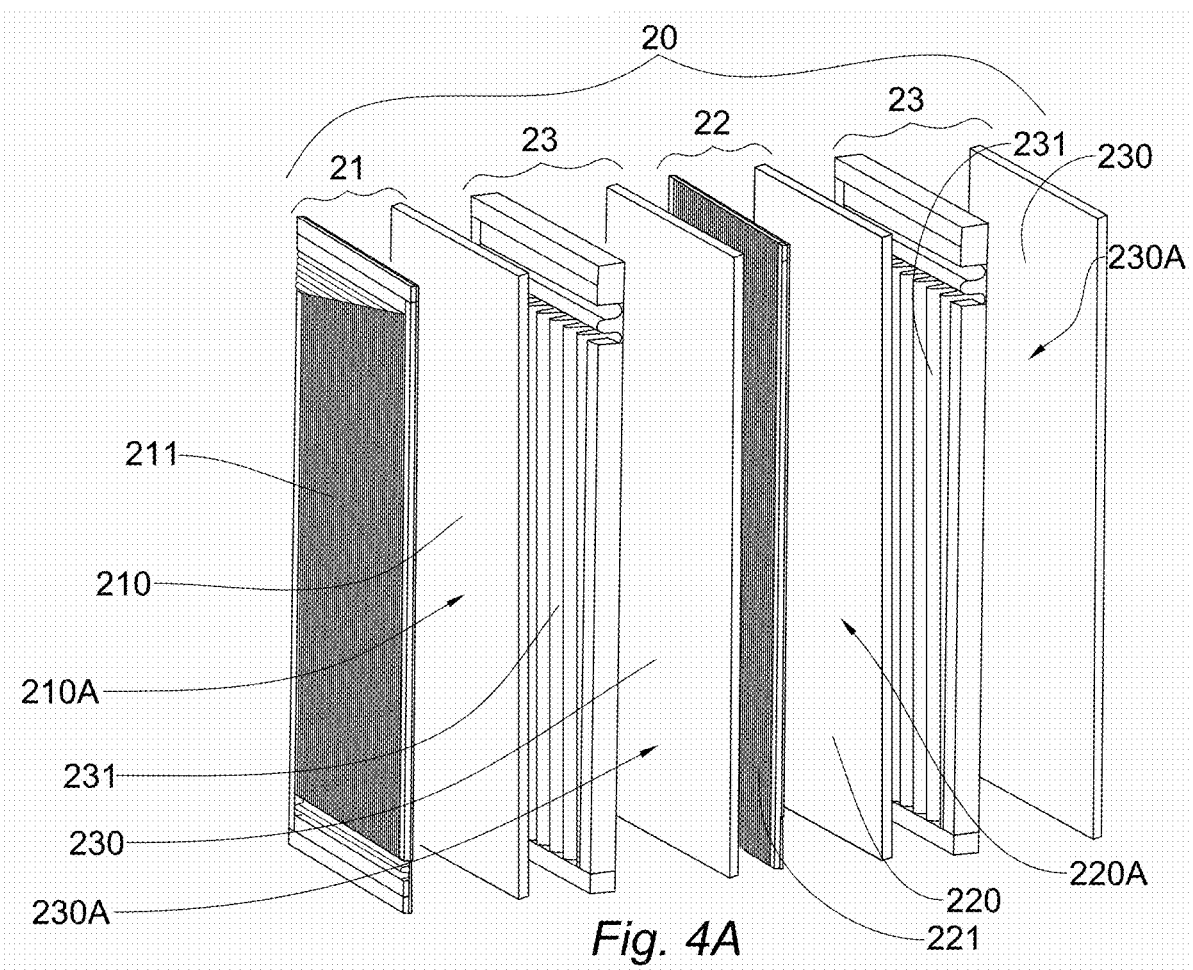
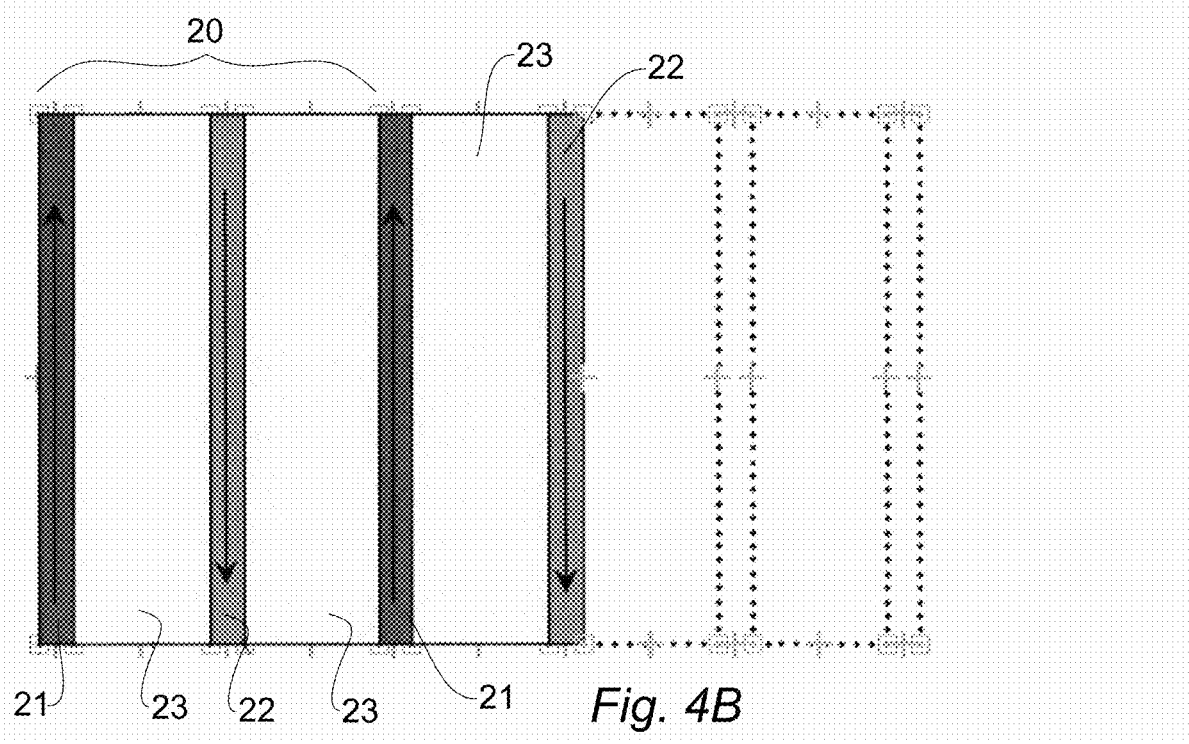

DEVICE FOR DRYING A GAS, IN PARTICULAR AIR

TECHNICAL FIELD

The present invention relates to a gas dryer device and a unit for the treatment of gas, in particular air, comprising said device, of the type comprising the features mentioned in the preamble of claim 1.

BACKGROUND

In the context of the technical installations for processing compressed gases, it is known to use units which are suitable for reducing the humidity in compressed gases, formed by a dryer which is associated with a refrigerating circuit.

In such units, an air flow to be dried is cooled, by means of the refrigerating circuit, to the temperature of the dew point in such a way that, following the passage into a condensate separator, the humidity level can be reduced.

In order to optimize the operation of the refrigerating circuit, in particular in terms of energy efficiency, it is known to use thermal masses in the evaporator, that is to say, in the zone in which the heat exchange occurs between the refrigerating fluid and the air to be dried.

An example of such a solution is described in the European Patent EP 405613 in which sand is used as the thermal mass.

Another solution is described in U.S. Pat. No. 8,857,207, in which the use of a phase change material (PCM) is suggested as the thermal mass to be used in the evaporator.

The solutions described in U.S. Pat. No. 8,857,207 or in other patent documents, such as, for example, U.S. Pat. No. 8,443,868, WO 2012/135864, US 2018/224213 or KR 2018/0086109, however, are not found to be optimal from the point of view of the heat exchange and are not able to adequately use the heat storage capacity offered by the PCM.

Furthermore, also from the point of view of the industrialization, such solutions are not found to be particularly suitable, requiring solutions which are specifically produced for receiving the phase change material.

This further has a negative incidence on the dimensions of the dryer which, however, would be desirable to be able to be produced in a compact form.

The technical problem addressed by the present invention is to provide a drying device for gas, in particular air, which is structurally and functionally configured so as to allow one or more of the disadvantages mentioned above with reference to the prior art to be at least partially overcome.

In the context of this problem, an object of the present invention is to generally improve the energy efficiency with partial loads in a drying device with respect to the known solutions.

Another object is to provide a drying device which allows the thermal storage properties of the phase change materials to be used in an optimum manner, allowing the acquisition of greater stability of the air temperature being discharged and in particular during the operational transients of the device.

Another object of the present invention is to provide a drying device which can readily be industrialized and which is optimized in terms of spatial requirement.

SUMMARY

This problem is solved by the drying device as set forth below and by a unit for processing gas, in particular air, comprising said device.

It will be appreciated that, in the drying device according to the present invention, there is provision for the presence of an evaporator which is formed by means of a plurality of layers, which are preferably grouped in a bundle and which comprise at least a first layer which is configured to receive a refrigerating fluid which is supplied by a refrigerating circuit, at least a second layer for receiving the air/gas to be dried and a plurality of third layers in which a phase change material is present.

According to an aspect of the invention, the layers are arranged in a sequence which comprises in alternation a first layer, a third layer, a second layer and a further third layer.

The Applicant has observed that this arrangement allows optimum use of the thermal storage capacities provided by the phase change material, consequently allowing an improvement of the efficiency with partial loads of the drying device.

Furthermore, this arrangement is particularly advantageous in order to use exchangers of the plate and fins type in the evaporator.

In fact, it will be appreciated that, according to another aspect of the invention, each of the first layer, second layer and third layer comprises a plate and a plurality of fins supported on a main surface of the plate. Advantageously, the fins form a plurality of channels for the passage of the refrigerating fluid, and for the passage of the air/gas to be dried and to contain the phase change material, respectively.

This aspect also contributes to optimizing the efficiency of the drying device and allows the production of a solution which can readily be industrialized, further allowing the use of constructive methodologies which are also common to the construction of drying devices which do not provide for the use of phase change materials.

In some embodiments of the invention, the layers are placed side by side with respect to each other in the sequence in the region of a respective plate, to the benefit of the compactness of the structure.

Additional preferred aspects of the invention are defined in the dependent claims.

BRIEF DESCRIPTION OF THE DRAWINGS

Furthermore, other advantages, features and the methods for use of the present invention will become clear from the following detailed description of a number of embodiments which are given by way of non-limiting example. Reference will be made to the Figures of the appended drawings, in which:

FIGS. 4A and 4B are a perspective, exploded view and a schematic illustration of a sequence of layers used in an evaporator of the drying device according to the present invention, respectively;

DETAILED DESCRIPTION OF THE PREFERRED EMBODIMENTS

Figure 1:
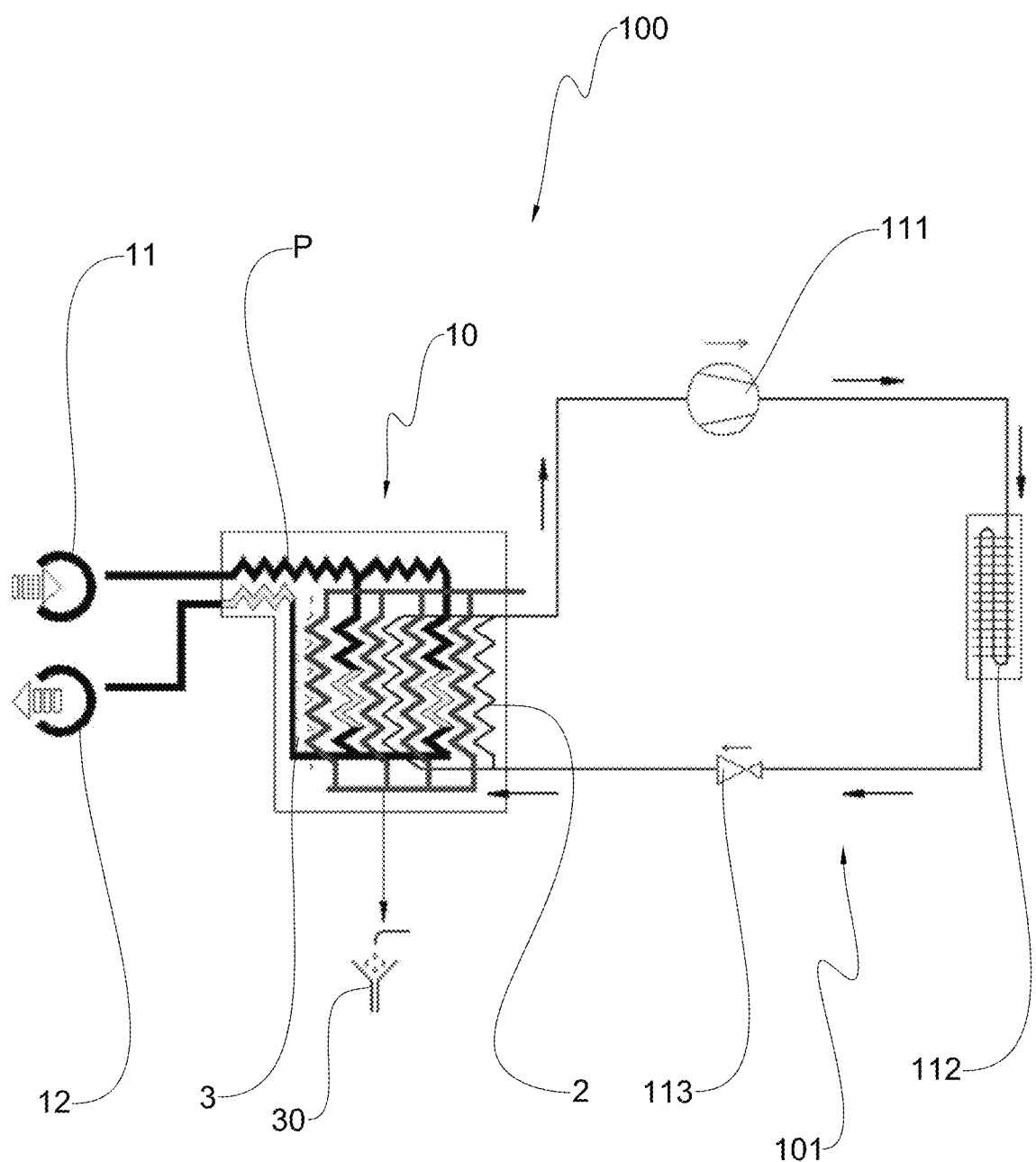
FIG. 1 is a schematic illustration of a unit for processing air/gas according to the present invention.

Initially with reference to FIG. 1, a processing unit for gas, in particular air, is generally indicated with the number 100.

The processing unit 100 is suitable for reducing the level of humidity contained in an air flow or flow of another gas and comprises a refrigerating circuit 101 and a drying device 10.

As schematically illustrated in the Figure, the refrigerating circuit 101 comprises a refrigerating compressor 111 which is suitable for compressing a refrigerating fluid, for example, formed by a refrigerating gas, in order to urge it through a condenser 112, where it is condensed in liquid form at high pressure.

The liquid then passes through a lamination member 113 and flows into an evaporator 2 which, as will be illustrated in greater detail below, is preferably integrated in the drying device 10.

Figure 2:
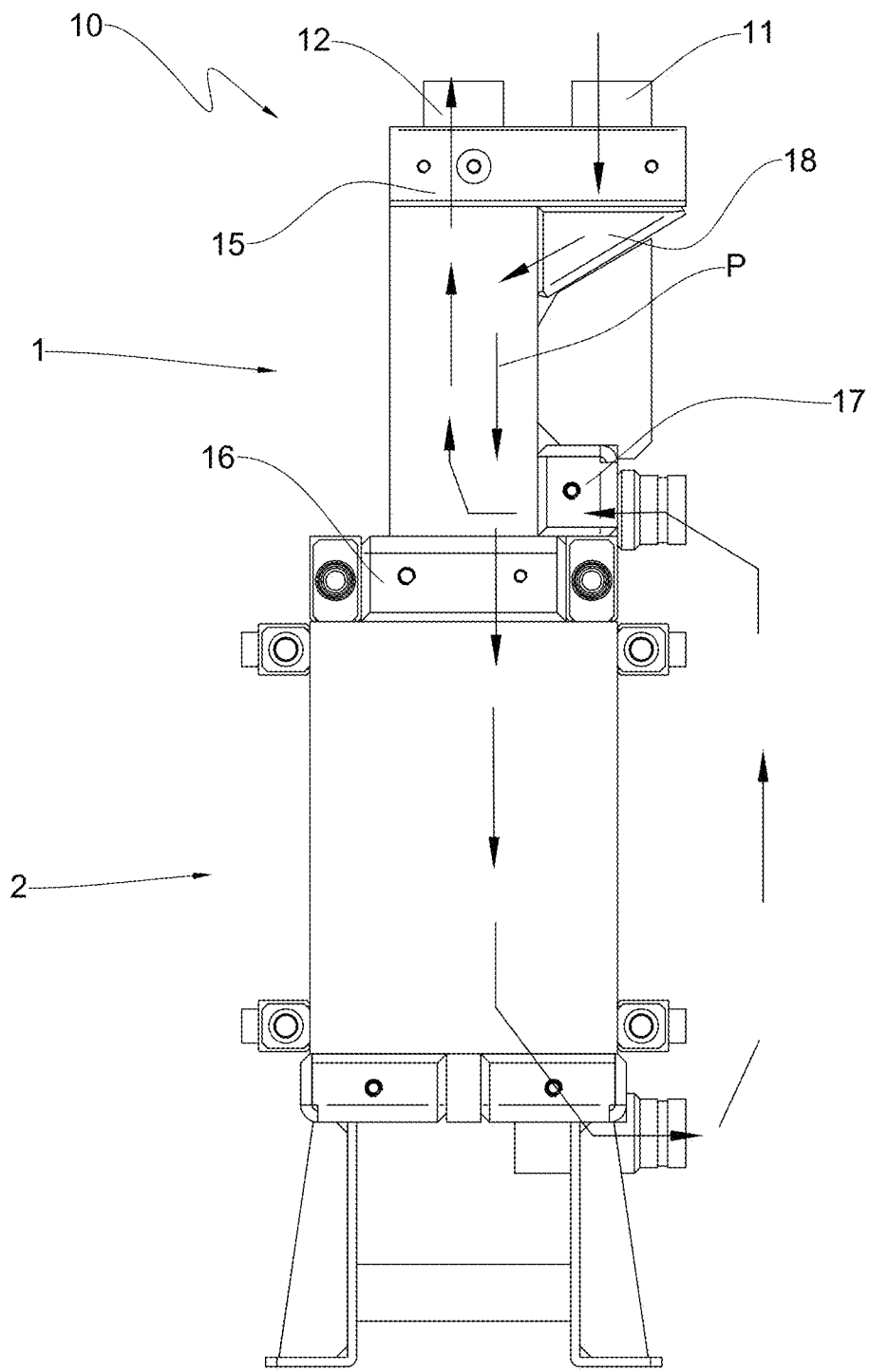
FIG. 2 is a side view of a drying device for air/gas according to the present invention used inside the unit for processing air/gas of FIG. 1.
Figure 3:
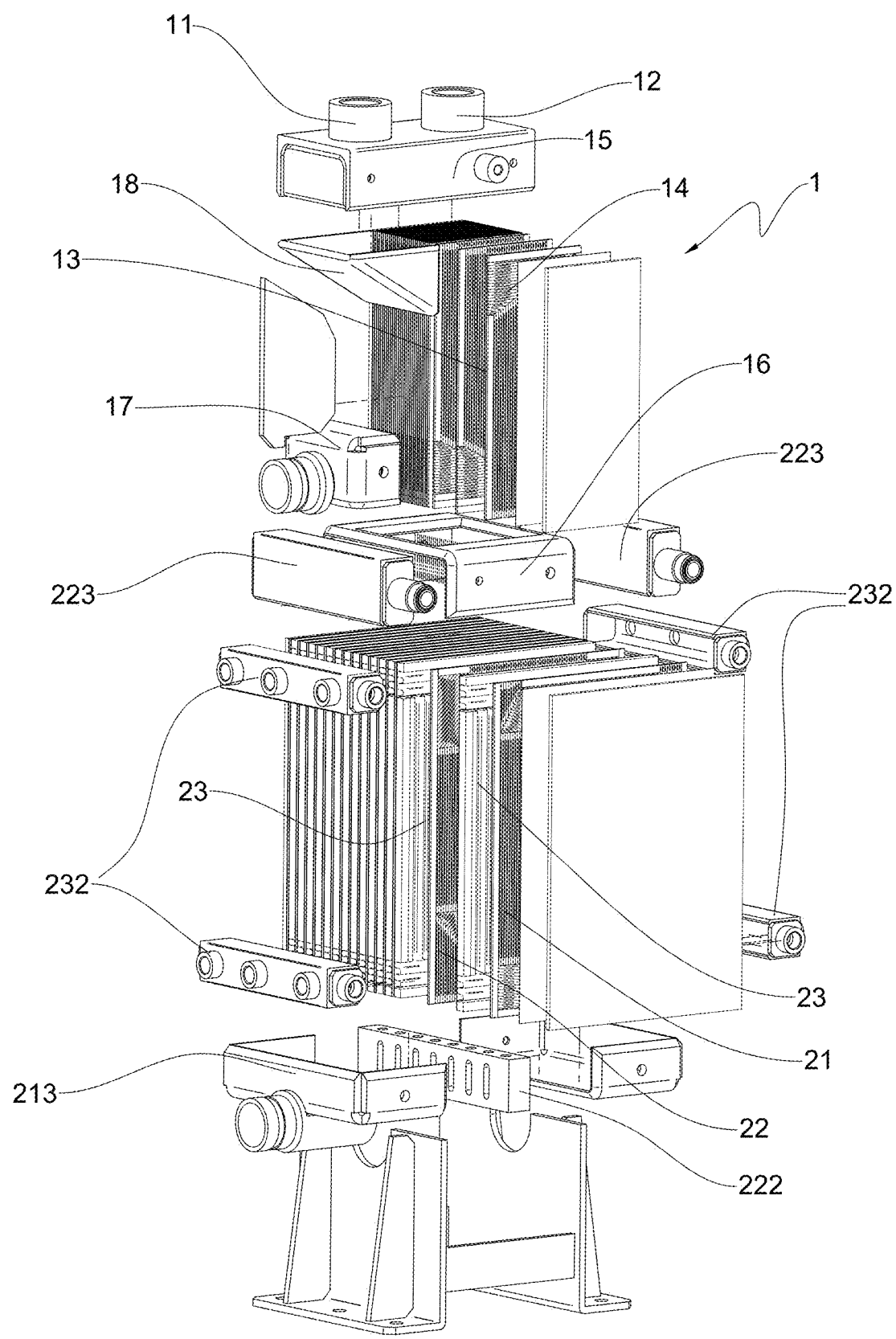
FIG. 3 is a perspective, exploded view of the drying device of FIG. 2.

Therefore, the refrigerating fluid may be used in the drying device 10, which is illustrated in detail in FIGS. 2 and 3, to reduce the temperature of the air flow, preferably up to the dew point, and to allow the separation of the condensate from the air and consequently to reduce its humidity level with techniques which are comparable with those used in the known drying solutions.

As indicated above, the evaporator 2 is preferably integrated inside the drying device 10 and is formed as a heat exchanger, the characteristics of which will be set out in detail below.

The evaporator is further associated with an air/air exchanger 1 which includes an inlet 11 for the gas to be dried and which is interfaced with the evaporator 2 in such a way to provide the air flow which is intended to be dried and which is introduced into the evaporator 2 by means of the inlet 11.

Preferably, the air/air exchanger 1 is arranged, during use, in a position vertically above the evaporator 2.

It will be appreciated that, in the context of the present invention, the terms "vertical" and "vertically" are intended to be understood to refer to the direction defined by gravitational force and therefore a direction perpendicular to a planar support surface.

As illustrated in FIG. 2, the gas flow carries out a path P inside the device 10 which preferably provides for the passage of the gas through the air/air exchanger 1, its introduction into the evaporator 2 and, while being discharged therefrom, the passage through a condensate separator 3, which is preferably connected to a related discharge 30, these components being illustrated schematically in FIG. 1.

In some embodiments, the gas, once it has been discharged from the evaporator 2 and has travelled through the condensate separator 3, is re-introduced inside the air/air exchanger 1 in order to carry out a heat exchange, preferably in counter-current, with the air/gas which is introduced through the inlet 11. After the heat exchange, the air/gas which has been dried in this manner is discharged from the device 10 by means of a respective outlet 12.

In some embodiments, the inlet 11 and the outlet 12 of the air/gas to be dried are arranged, during use, in the region of an upper portion of the drying device 10, preferably one beside the other.

Preferably, the air/air exchanger 1 comprises a plurality of inlet layers 13 which are arranged in counter-current and alternately with respect to a plurality of outlet layers 14.

These layers can be formed by means of finned packs which generally form a heat exchanger of the plate and fins type.

The flows from the various layers are collected by means of respective collectors. In some embodiments, the inlet layers provide for an inlet collector 18 and an outlet collector 16, respectively, which are arranged in the region of opposite ends of the exchanger 1 in the direction of the gas flow to be dried. The inlet collector 18 may extend laterally with respect to the layers 13 so as to allow positioning of the inlet 11 and outlet 12 side by side.

The outlet layers 14 may have respective inlet collectors 17 and outlet collectors 15, the first being arranged laterally with respect to the direction of flow so as not to interfere with the opposing flow.

According to another aspect of the invention, the heat exchange takes place inside the evaporator 2 with the refrigerating fluid which, as previously illustrated, is supplied by the refrigerating circuit 101 which is associated with the drying device 10.

The evaporator 2 of the drying device of the present invention further provides for the presence of a phase change material PCM which is thermally associated with the refrigerating fluid and the air to be dried.

Examples of suitable materials for use as a PCM are constituted by organic PCMs, such as paraffins or acids.

It will be appreciated that the evaporator 2 of the device according to the present invention comprises a plurality of adjacent layers which include at least a first layer 21, in which the refrigerating fluid of the circuit 101 flows, at least a second layer 22, in which the air or other gas to be dried from the air/air exchanger 1 is caused to pass, and a plurality of third layers 23, in which the phase change material is present.

Preferably, each layer comprises a plate which is indicated as 210, 220, 230, respectively, and a plurality of fins which are in turn indicated as 211, 221, 231 in the Figures. On the basis of preferred embodiments, the fins can be arranged in a state supported on a main surface 210A, 220A, 230A of the plate so as to form a plurality of channels wherein the air to be dried, the refrigerating fluid or the phase change material may be present in accordance with the type of layer.

On the basis of an aspect of the invention, the layers are arranged in a sequence 20 which comprises in alternation a first layer 21, a third layer 23, a second layer 22 and a further third layer 23, as illustrated in FIGS. 4A and 4B. This sequence may be repeated inside the evaporator and may be interrupted once the dimensions required for the evaporator 2 in accordance with the design data of the drying device 10 are reached.

A bundle of layers is thereby formed, between which the heat exchange takes place.

In some embodiments, the layers 21, 22, 23 are beside each other in the sequence 20 in the region of a respective plate 210, 220, 230, with the main surfaces thereof, corresponding to the surface having greatest dimensions of the plate, one facing the other. In other words, the layers which preferably have a planar extent are arranged parallel with each other.

It will also be appreciated that, in the evaporator 2, each of the internal layers in which the air/gas to be dried or the refrigerating fluid travels is interposed between two third layers which contain the phase change material.

In this configuration, each third layer 23 is interposed between a first layer 21 and a second layer 22. In other words, two third layers are preferably not present one after the other.

In some embodiments, however, the external layers are in contact with a single third layer, that is to say, the end layers of the evaporator are formed by a first layer 21 in which the refrigerating fluid travels or by a second layer 22 inside which the air/gas travels.

In some embodiments, the first layer 21, the second layer 22 and the third layer 23 have a mainly planar extent. In other words, two dimensions of the layers present in the evaporator are prevalent with respect to the third dimension.

Advantageously, the extent inside the plane of prevalent development of the first layer 21 is equal to the corresponding extent of the second layer 22 which is in turn equal to the corresponding extent of the third layer 23.

More generally, the first layer 21 may have an extent in a plane of prevalent development equal to the extent in this plane of the third layer 23.

Advantageously, the second layer 22 may also have an extent in a plane of prevalent development equal to the extent in this plane of prevalent development of the third layer 23.

In some embodiments, the first layer 21 may have an extent in a plane of prevalent development equal to the extent in this plane of the second layer 22. Therefore, there may also be provision for a preferred embodiment in which all the layers, that is to say, the first, second and the third, may have the same extent in the above-mentioned plane.

Now with reference again to FIGS. 2 and 3, in some embodiments the refrigerating liquid is introduced inside the evaporator 2 through a collector 222 which is arranged in the region of a lower portion of the evaporator 2.

Figure 6:
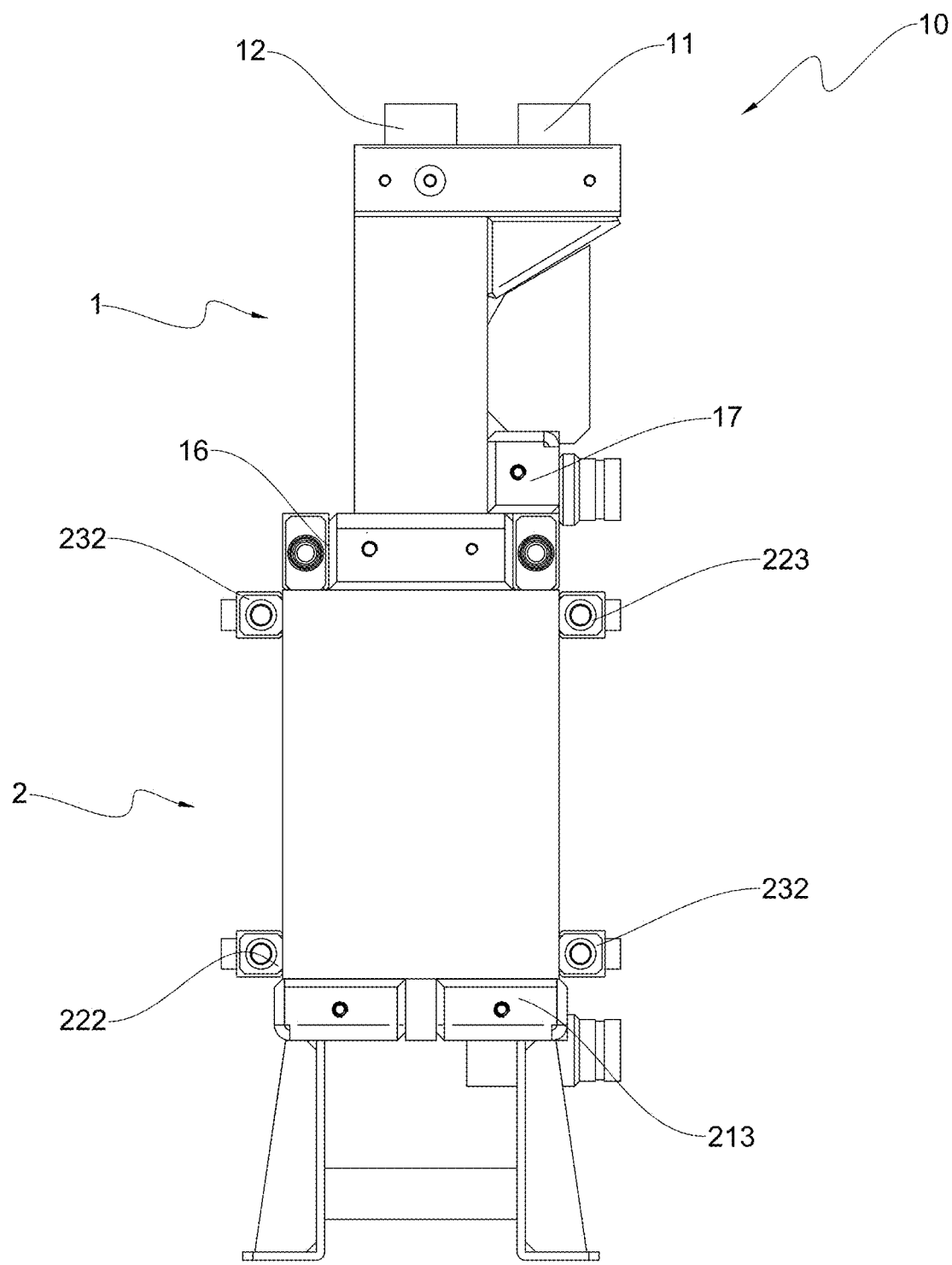
FIG. 6 is a side view of the drying device of the present invention according to an alternative embodiment.

The collector 222 may be arranged below the second layers 22 or, in a construction variant, illustrated in FIG. 6, laterally relative thereto, still in the region of a lower portion.

The discharge of the refrigerating liquid may be carried out by means of two outlet collectors 223, between which the outlet collector 16 of the air/air exchanger is preferably arranged, which can advantageously also perform the function of an inlet collector for the gas to be processed towards the evaporator 2.

In a specular manner, the discharge of the gas from the evaporator 2 is carried out in the region of the lower portion thereof by means of a respective collector 213.

This collector receives the gas flows which are discharged from the single layers and which are reduced to the dew point by means of the heat exchange which takes place in the evaporator 2 in order to convey them by means of a single pipe to the condensate separator 3.

Now with particular reference to FIG. 3, the third layers 23 which contain the PCM are also connected to respective collectors 232 which in this case are suitable for introducing and discharging the material inside the evaporator 2. In this manner, the replacement or the re-integration of the phase change material may be allowed if necessary.

Therefore, it will be appreciated that, as a result of the above-described embodiments, the drying device 10 can be constructed with a compact solution which can readily be integrated inside the processing unit 100.

Figure 5A:
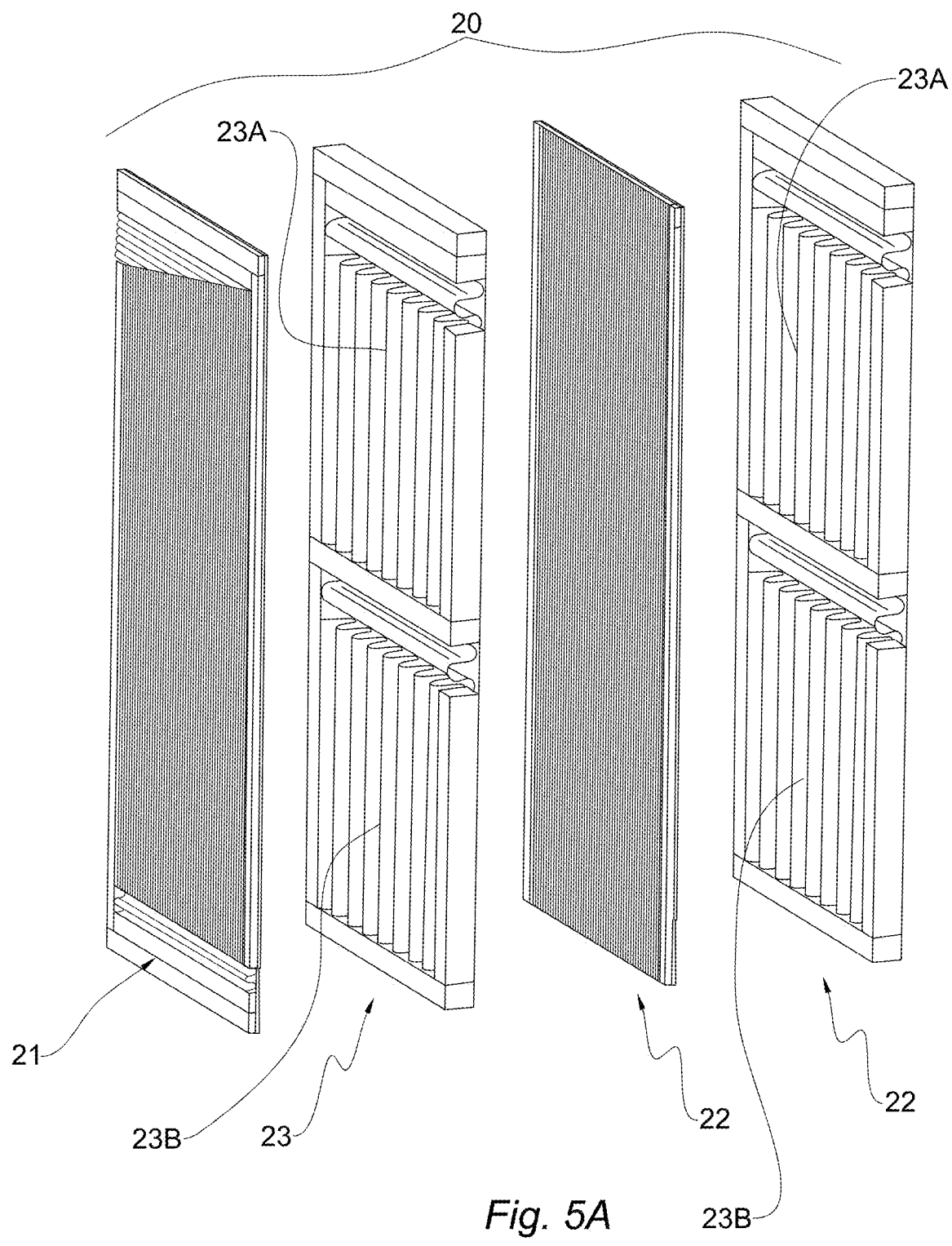
FIGS. 5A and 5B are a perspective, exploded view and a schematic illustration of the sequence of layers of the evaporator in a construction variant, respectively.
Figure 5B:
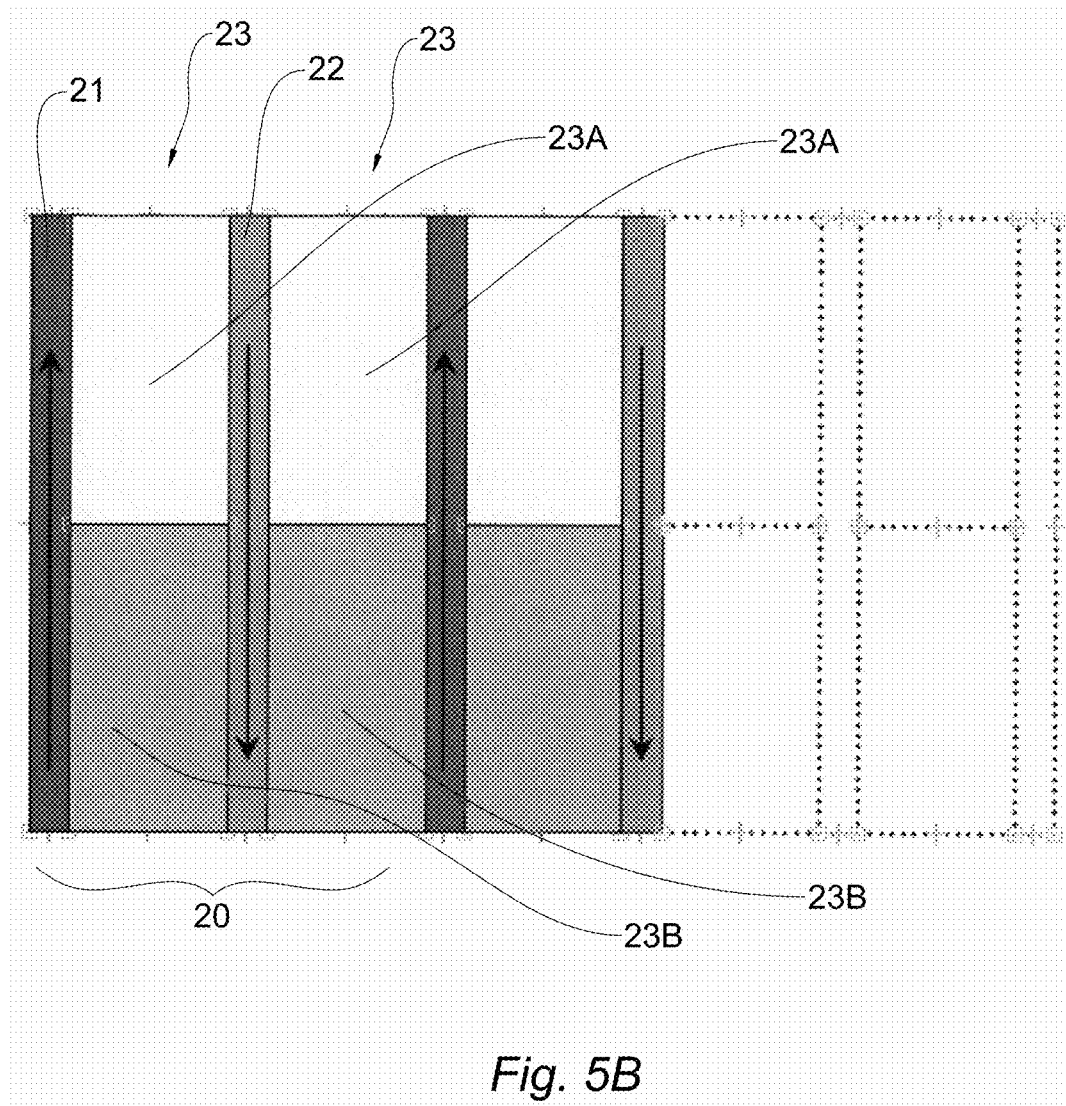

Now with reference to FIGS. 5A and 5B, in a construction variant of the invention the third layers 23 are configured so as to receive therein two different phase change materials.

To this end, in some embodiments there is provision for the layers 23 to comprise a first portion 23A and a second portion 23B which are suitable for receiving the first phase change material and the second phase change material, respectively.

Preferably, the first portion 23A is arranged during use in a position which is vertically higher than the second portion 23B.

This advantageously allows the action of the phase change material to be differentiated between the first heat exchange phase which is carried out in the upper portion of the evaporator and the second heat exchange phase which is carried out in the lower portion.

Therefore, the invention solves the problem set out, at the same time achieving a plurality of advantages, including the possibility of using in an appropriate manner the characteristics of the phase change materials to the benefit of the energy efficiency of the processing unit.

Those benefits are inter alia particularly evident in the phases in which the unit operates with reduced load as a result of the capacities for individual thermal absorption of the phase change materials.

Furthermore, the forms and characteristics of the drying device allow simple production engineering and construction thereof.

In addition, the device according to the present invention allows the achievement of better control of the humidity value of the air/gas being discharged and smaller variations of the humidity during the operation in the transients, in particular during the start-ups and stoppages of the compressor.

The invention claimed is:

1. A drying device for processing a gas to be dried, comprising an air/air exchanger which includes an inlet for the gas to be dried and an outlet for the dried gas, an evaporator which receives the gas to be dried from the air/air exchanger, the evaporator comprising a plurality of adjacent layers, the layers comprise a plurality of first layers configured for passage of a refrigerating fluid which flows inside a refrigerating circuit which can be associated with the drying device, a plurality of second layers configured to receive the gas to be dried from the air/air exchanger and a plurality of third layers configured to receive a phase change material, wherein the first, second and third layers each comprise a plate and a plurality of fins supported on a main surface of the plate, where the fins form a plurality of channels for the passage of the refrigerating fluid, for the passage of the air/gas to be dried and to contain the phase change material, respectively, the first, second and third layers being arranged in a sequence which comprises in alternation a first layer, a third layer, a second layer and a further third layer, and wherein the air/air exchanger is arranged, during use, in a position vertically above the evaporator, wherein the refrigerating fluid is introduced inside the evaporator through a refrigerating fluid inlet collector which is arranged in the region of a lower portion of the evaporator, the refrigerating fluid flowing upwards through said first layers towards two refrigerating fluid outlet collectors, wherein said refrigerating fluid inlet collector comprises a plurality of holes, each hole being connected to a respective channel of said plurality of channels for connection with said first layers, the lower portion further comprising gas collectors for discharge of the gas from the evaporator, the refrigerating fluid inlet collector being arranged between the gas collectors, the air/air exchanger comprising an air/air exchanger outlet collector, said air/air exchanger outlet collector being arranged between said refrigerating fluid outlet collectors, said air/air exchanger outlet collector forming a respective inlet collector for the gas to be processed towards the evaporator.

2. The drying device according to claim 1, wherein the first, second and third layers are placed side by side with respect to each other in the sequence in the region of a respective plate.

3. The drying device according to claim 1, wherein the inlet and the outlet of the gas to be dried are arranged, during use, in a region of an upper portion of the drying device.

4. The drying device according claim 1, wherein a path of the gas to be dried inside the device is defined so that the gas, once discharged from the evaporator, is re-introduced inside the air/air exchanger in order to carry out a heat exchange, with the gas introduced through the inlet.

5. The drying device according to claim 4, wherein said inlet and outlet of the gas to be dried are arranged, during use, in a region of an upper portion of the drying device and wherein the path is configured so that the gas to be dried leaves the evaporator in a region of a lower portion of the drying device which is arranged in an opposite position with respect to the inlet and outlet.

6. The drying device according to claim 1, wherein the third layers are configured so as to receive a first and a second phase change material.

7. The drying device according to claim 6, wherein the layers comprise a first portion and a second portion, configured to receive the first and the second phase change material, respectively.

8. The drying device according to claim 7, wherein the first portion is arranged, during use, in a position vertically above the second portion.

9. The drying device claim 1, wherein the third layer is interposed between the first layer and the second layer.

10. The drying device according to claim 1, wherein the first layer, the second layer and the third layer have a prevalently planar development.

11. The drying device according to claim 10, wherein the first layer has an extent in a plane of prevalent development which is equal to the extent in the plane of prevalent development of the third layer.

12. The drying device according to claim 10, wherein the second layer has an extent in a plane of prevalent development equal to the extent in the plane of prevalent development of the third layer.

13. The drying device according to claim 11, wherein the second layer has an extent in a plane of prevalent development equal to the extent in the plane of prevalent development of the third layer.

14. A unit for processing gas comprising a refrigerating circuit and a drying device according to claim 1, the refrigerating circuit being associated with the drying device so as to supply refrigerating fluid in the first layer.

15. A drying device for processing a gas to be dried comprising an air/air exchanger which includes an inlet for the gas to be dried and an outlet for the dried gas, an evaporator which receives the gas to be dried from the air/air exchanger, the evaporator comprising a plurality of adjacent layers, the layers comprise a plurality of first layers configured for passage of a refrigerating fluid which flows inside a refrigerating circuit which can be associated with the drying device, a plurality of second layers configured to receive the gas to be dried from the air/air exchanger and a plurality of third layers configured to receive a phase change material, wherein the first, second and third layers each comprise a plate and a plurality of fins supported on a main surface of the plate, where the fins form a plurality of channels for the passage of the refrigerating fluid, for the passage of the air/gas to be dried and to contain the phase change material, respectively, the layers being arranged in a sequence which comprises in alternation a first layer, a third layer, a second layer and a further third layer, in which each of said first layer, second layer and third layer comprises a plate and a plurality of fins, supported on a main surface of said plate, in which said fins form a plurality of channels respectively for the passage of the refrigerant fluid, for the passage of the air/gas to be dried, and to contain the phase change material, said layers being side by side in said succession in a region of a respective plate, and in which said first layer, said second layer and said third layer have a mainly flat development, and wherein the air/air exchanger is arranged, during use, in a position vertically above the evaporator,
   wherein the refrigerating fluid is introduced inside the evaporator through a refrigerating fluid inlet collector which is arranged in the region of a lower portion of the evaporator, the refrigerating fluid flowing upwards through said first layers towards two refrigerating fluid outlet collectors,
   wherein said refrigerating fluid inlet collector comprises a plurality of holes, each hole being connected to a respective channel of said plurality of channels for connection with said first layers,
the lower portion further comprising gas collectors for discharge of the gas from the evaporator, the refrigerating fluid inlet collector being arranged between the gas collectors,
   the air/air exchanger comprising an air/air exchanger outlet collector, said air/air exchanger outlet collector being arranged between said refrigerating fluid outlet collectors, said air/air exchanger outlet collector forming a respective inlet collector for the gas to be processed towards the evaporator.

16. The drying device according to claim 15, wherein the first layer has an extent in a plane of prevalent development which is equal to an extent in a plane of prevalent development of the third layer.

17. The drying device according to claim 15, wherein the second layer has an extent in a plane of prevalent development equal to an extent in a plane of prevalent development of the third layer.

18. The drying device according to claim 16, wherein the second layer has an extent in a plane of prevalent development equal to the extent in the plane of prevalent development of the third layer.

\* \* \* \* \*